United States Patent
Heim et al.

(12)

(10) Patent No.: US 6,374,373 B1
(45) Date of Patent: Apr. 16, 2002

(54) METHOD FOR COMMISSIONING A BUS SYSTEM AND A CORRESPONDING BUS SYSTEM

(75) Inventors: Armin Heim, Bregenz; Joachim Geiginger, Hohenems, both of (AT)

(73) Assignee: Luxmate Controls GmbH, Dornbirn (AT)

( * ) Notice: Subject to any disclaimer, the term of this patent is extended or adjusted under 35 U.S.C. 154(b) by 0 days.

(21) Appl. No.: 09/660,351

(22) Filed: Sep. 12, 2000

Related U.S. Application Data

(63) Continuation of application No. PCT/EP99/01598, filed on Mar. 11, 1999.

(30) Foreign Application Priority Data

Mar. 18, 1998 (DE) ........................................ 198 11 894

(51) Int. Cl.[7] ................................................. G06F 11/26
(52) U.S. Cl. ....................................................... 714/43
(58) Field of Search ............................. 714/43, 56, 36; 710/102, 103, 126; 700/19, 20, 65, 275

(56) References Cited

U.S. PATENT DOCUMENTS

| | | | | |
|---|---|---|---|---|
| 3,800,214 A | * | 3/1974 | O'Flynn ..................... | 324/51 |
| 4,463,352 A | | 7/1984 | Forbes et al. ............... | 340/825 |
| 4,514,845 A | * | 4/1985 | Starr ........................... | 371/15 |
| 4,729,124 A | | 3/1988 | Hansel et al. ................ | 371/18 |
| 5,565,855 A | * | 10/1996 | Knibbe ................... | 340/825.06 |
| 5,583,448 A | | 12/1996 | Corder et al. ................ | 326/30 |
| 5,805,052 A | | 9/1998 | Hansemman et al. .. | 340/310.01 |
| 5,898,861 A | * | 4/1999 | Emerson et al. ............. | 395/500 |
| 5,958,056 A | * | 9/1999 | Lehmann .................... | 713/310 |
| 6,222,853 B1 | * | 4/2001 | Marttinen et al. .......... | 370/465 |

FOREIGN PATENT DOCUMENTS

| | | |
|---|---|---|
| DE | 9412900 U1 | 11/1995 |
| DE | 29701412 U1 | 7/1998 |
| EP | 0772320 A2 | 5/1997 |
| WO | WO91/10276 | 7/1991 |

OTHER PUBLICATIONS

"X–10 Powerhouse" Brochure, date unknown.*

Lawrence Cohen, "Testing the Subscriber Interface to the ARINC 629 Current Mode Bus", Proceedings of the Systems Readiness Technology Conference (Autotestcon), Anaheim, Sep. 20–22, 1994, No. Conf.. 30, Sep. 20, 1994, pp. 653–61, XP000554161 Institute of Electrical and Electronics Engineers.

* cited by examiner

Primary Examiner—Scott T. Baderman
(74) Attorney, Agent, or Firm—Fitzpatrick, Cella, Harper & Scinto

(57) ABSTRACT

The invention relates to a method for commissioning a bus system and to a corresponding bus system. A test is carried out preferably after installation of the bus system and before it is actually put into operation to check whether the system is functioning properly. The test can comprise several stages which each test different functional aspects of the bus system. The bus system test can be carried out especially from a distributor or gateway (1) which couples several voltage supply lines (2–4), designed to carry information in addition to a supply voltage, with a central voltage supply line (L, N).

42 Claims, 4 Drawing Sheets

METHOD FOR COMMISSIONING A BUS SYSTEM AND A CORRESPONDING BUS SYSTEM

IDENTIFICATION OF RELATED APPLICATIONS

This is a Continuation of International Application PCT/EP99/01598, filed Mar. 11, 1999.

BACKGROUND OF THE INVENTION

1. Field of the Invention

The present invention relates to a method for commissioning a bus system which comprises at least one voltage supply line by way of which, on the one hand, a supply voltage is applied to loads that can be connected thereto and, on the other hand, information is transmitted, and also to a corresponding bus system, in which by way of at least one voltage supply line, on the one hand, a supply voltage is applied to loads that can be connected thereto and, on the other hand, information, for example control information, is transmitted.

2. Description of the Related Art

Bus systems, in which the main power lines leading to the individual components and loads are used as the bus line, have been known for a comparatively long period of time.

A corresponding bus system for use for building services management system installations is known, for example, from PCT/EP 97/06577, in which various loads (actuators), such as, for example, lights, blinds, air-conditioning installations or the like, are connected to the bus system. Moreover, information in order to be able to activate the individual loads with the aid of this information or to be able to transmit corresponding check-back signal information is transmitted by way of the main power lines provided for these loads. The information that is transmitted in this way by way of the main power lines is as a rule transmitted at a frequency that is higher by orders of magnitude than the actual main frequency of the bus system, with in particular the useful band, which is used for the transmission of information, lying above 100 kHz. The loads can decouple the individual information signals from the low-frequency supply voltage signal by way of appropriately configured filter circuits.

As a rule, the information is transmitted by way of the main power lines merely within one subnetwork which is connected to the central supply voltage line by way of a band-stop filter arrangement and also a distributor device (gateway). By using band-stop filters it is possible to isolate the individual subnetworks from the rest of the network. In this connection, an improved measure has been proposed in PCT/EP97/06577, namely that for each branch line corresponding to a subnetwork a separate band-stop filter be provided, connected between the distributor device (gateway) and the corresponding branch line. The advantage of this arrangement, in comparison with an arrangement in which a central band-stop filter is connected between the central supply voltage line and the distributor device, is that the individual band-stop filters can be set up in a less complex manner than a single central band-stop filter and, moreover, the information signals cannot reach the central main-voltage busbar of the distributor, something which could otherwise result in great attenuation of the information signals. Moreover, disturbances within a branch line are not transmitted directly to the other branch lines or subnetworks.

In addition to different loads it is also possible to connect any sensors, interfaces or control units to the individual branch lines or supply voltage lines respectively so that communication between the individual components of the bus system is possible with the aid of the previously mentioned transmission of information by way of the corresponding supply voltage line.

Furthermore, a control system is known from PCT/EP90/01133 for a plurality of loads that are arranged in a distributed manner and which can be activated by a central control station or control unit so that in this way it is possible to set different load types in a decentralized manner. Each load stores a source address which is transmitted to the control station by the respective load before the control system is actually commissioned. Subsequently, the control station scans the corresponding loads by addressing the individual source addresses in order in this way to obtain information on the spatial arrangement and type of the respective load. Furthermore, the individual loads are associated with specific groups or arrangements of loads, with the control station subsequently storing an operating address in the individual loads that corresponds to the respective group association. In this way, loads that are linked together centrally in groups or loads of a specific load type can be set by the control station, with, moreover, the greatest possible flexibility of the control system being guaranteed by the address administration. The control system described in PCT/EP90/01133 does not, however, relate explicitly to the bus systems described by way of introduction and in which, together with the supply voltage signal of low frequency, information signals of higher frequency are simultaneously transmitted by way of mains power lines.

The reliability of transmission, that is, the guarantee of sufficient quality of the transmission of information signals, constitutes one particular problem of the bus systems previously described. In this connection, it is possible that disturbances can occur not only on the forward channel, that is, from the gateway or distributor to the individual loads, but also on the backward channel, that is, from the individual loads to the distributor, as a result of which disturbances the information signals, such as, for example, control signals or check-back signals can not be transmitted with sufficient quality or even can no longer be received so that, in that case, it is not possible for the bus system to operate properly.

Proper operation is essential, for example, in the case of bus systems which are used in airplanes. For this reason, for example, the ARINC 629 bus used in airplanes of the Boeing 777 type contains a plurality of safety systems by means of which the failure of a system element is automatically identified and offset by the use of an identical replacement element. However, when viewed from the outside it is not readily apparent whether a bus user or the branch cable used to connect the bus users to the bus lines is defective in part. In the article "Testing the Subscriber Interface to the ARINC 629 Current Mode Bus" in the journal "Proceedings of the Systems Readiness Technology Conference (AUTOTESTCON)", Anaheim, September 1994, pages 653–661, a test system is therefore put forward, by means of which system it is possible to examine the branch cable in a controlled manner to check whether it is functioning fully in a proper manner. To this end, a test module has been developed that is connected to the branch cable and the bus user connected thereto and which, by transmission and simulation of bus signals and also by evaluation of the signals which occur in the branch cable, carries out a full function test that includes monitoring whether the replacement elements are functioning properly.

Whilst the test system described in this article does investigate the individual branch cables in an extremely precise manner, it is not able to examine the bus system as a whole to check whether it is functioning properly. For example, it is not possible to identify whether the bus lines are functioning properly and the users are correctly connected to the bus, since the units which are to be tested are directly connected to the test module.

The underlying object of the present invention is therefore to facilitate the commissioning of the bus system outlined by way of introduction and also to guarantee at the same time sufficient security against loss of quality or against disturbances by examining the ability of the bus system as a whole to function properly by means of a test which can be carried out in a simple manner.

SUMMARY OF THE INVENTION

The object is achieved in accordance with the present invention by means of a commissioning method which comprises the steps of a) installing the bus system;

b) testing whether the bus system is functioning properly; and c) operating the bus system, wherein step b) comprises the step of carrying out a plurality of test phases in succession, wherein different aspects of the bus system's ability to function properly are tested, and including during a first test phase the step of testing the correct connection of loads, sensors and/or control devices to respective voltage supply lines.

According to the present invention for commissioning purposes a function test is carried out after the bus system has been installed and before it is actually put into operation, with this test including a plurality of test phases which are carried out in succession and which test different aspects of the bus system's ability to function properly. In particular, in this connection during a first test phase the connection of loads, sensors and/or control devices to the correct respective voltage supply is tested. For the case where a plurality of subnetworks or branch lines, by way of which information signals are to be transmitted together with the supply voltage signal of low frequency, are connected to the central voltage supply line by way of the distributor or gateway that has previously been described, it is advantageously provided that the individual subnetworks to be tested separately or individually so that whilst one branch line is being tested, the other branch lines are without current.

According to a preferred exemplary embodiment, the test comprises three test phases. Thus, the first test phase, in addition to examining whether the loads, sensors or control units are correctly connected, can also examine whether the safety functions of the loads, implemented as standard if applicable, are reacting correctly. With the aid of a second test phase it is possible to test the sending capacity of the gateway or distributor and also the receiving capacity of the individual loads, sensors or control units. After the run-through of this second test phase, it is thus established whether all the loads can correctly understand the messages that are sent by the gateway. Finally, with the third test phase it is possible to test the transmission of information by way of the backward channel of the bus system, that is, from the loads or actuators to the gateway, by evaluating the quality of the check-back signals or status information transmitted by the loads.

The gateway used in the case of the bus system in accordance with the present invention is used in the first place as an interface between a central supply voltage and the individual subnetworks or branch lines by way of which transmission of information is to take place together with the supply of voltage. The distributor, however, can also have a functionality that is peculiar to it, such as, for example, the commissioning function. Likewise, however, it is also possible for the commissioning or test function to be carried out by a control device which is connected to one of the bus lines and which by way of the distributor communicates with the individual subnetworks which are provided for the purpose of transmitting information.

BRIEF DESCRIPTION OF THE DRAWINGS

The invention is described in greater detail in the following with reference to a preferred exemplary embodiment.

DETAILED DESCRIPTION OF THE PREFERRED EMBODIMENT

Figure 1:
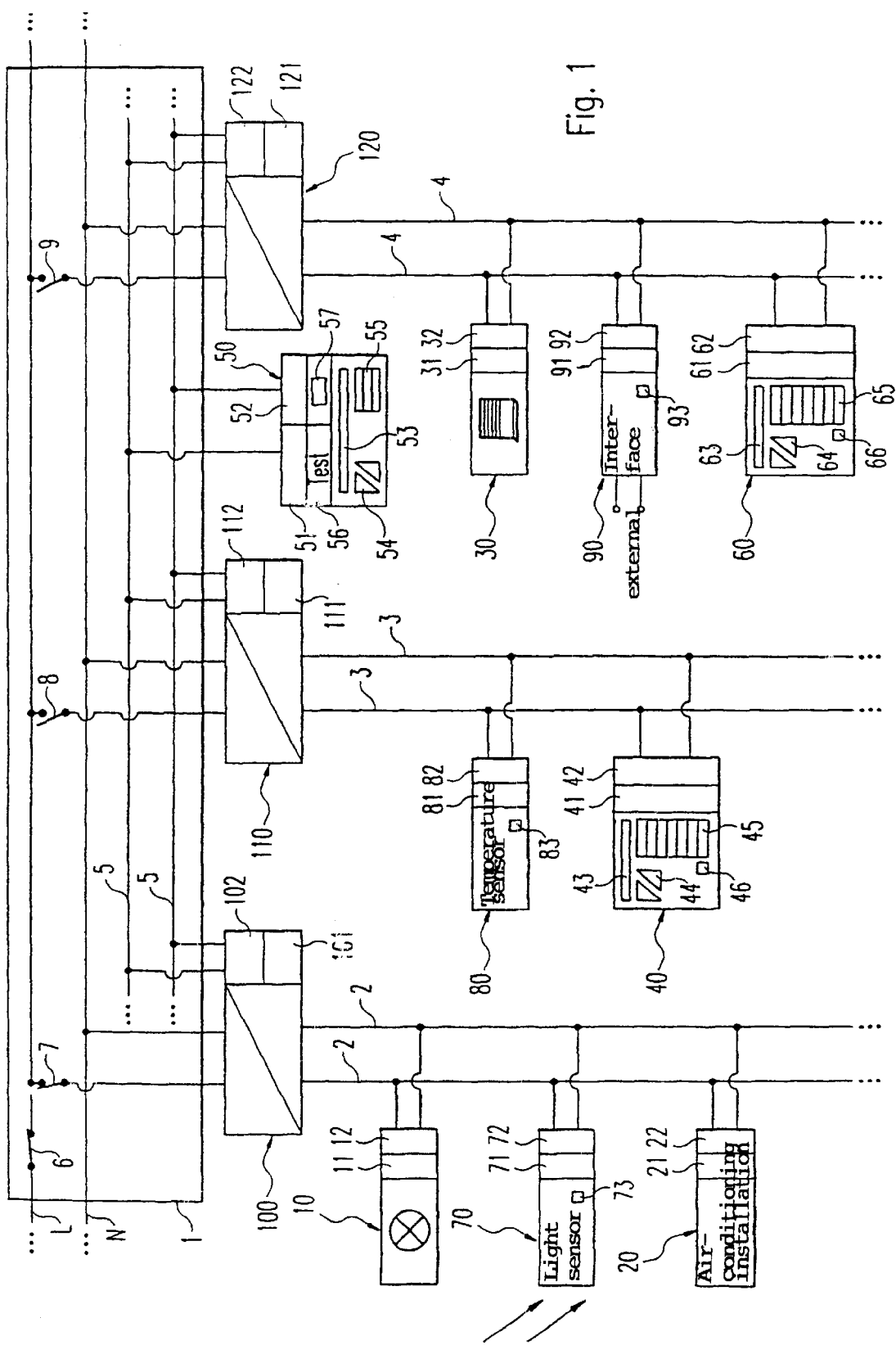
FIG. 1, by way of example, shows the structure of a preferred exemplary embodiment of a bus system in accordance with the present invention.

FIG. 1 shows a central voltage supply line or main power line having a current-carrying conductor L and a neutral conductor N. Connected to this central mains power line there is a distributor or gateway 1 by means of which there branch off from the central mains power line a plurality of further voltage supply lines 2–4 which form subnetworks or electric circuits for the bus system and are used for supplying voltage to loads 10, 20 and 30, connected to these voltage supply lines 2–4, and also for transmitting information.

The transmission of information by way of the individual voltage supply lines 2–4 is effected in a frequency band that is higher by a plurality of orders of magnitude than the low alternating voltage frequency of the mains voltage that is applied to the central mains voltage line L, N. The subnetworks, which are used for the transmission of information and are formed in particular by the voltage supply lines 2–4 that are branched off, are separated from the central mains power line L, N by band-stop filters 100, 110 and 120. According to the configuration shown in FIG. 1, the band-stop filters 100, 110 and 120 are arranged between the voltage-supply lines 2–4 used for the transmission of information and the distributor 1 and represent stop filters for the frequency ranges used for the transmission of information. However, in order to enable there to be transmission of information between the individual voltage supply lines 2–4 as well, according to FIG. 1 the individual band-stop filters 100, 110 and 120 are connected by way of a two-phase bus line 5 and each have a coding and decoding unit 101, 111 and 121 respectively for coding and decoding the information that is to be transmitted and also a sending and receiving unit 102, 112 and 122 respectively for sending and receiving the information that is transmitted. Consequently, it is not only possible to transmit information on the individual voltage supply lines 2, 3 and 4, but it is also possible to transmit information between the individual voltage supply lines 2, 3 and 4.

The bus or building services management system shown in FIG. 1 includes a plurality of different loads which can be arranged, for example, in different rooms of a building and can be connected to the individual voltage supply lines 2–4. In particular, a lighting device 10, an air-conditioning installation 20, which is used to regulate the temperature of and ventilate a room, and also a blacking-out device 30, for example a blind with a corresponding driving motor, are shown in FIG. 1. These loads are supplied with the mains voltage by way of the voltage supply lines which are connected to the loads in a corresponding manner. Moreover, the voltage supply lines, which are connected to the loads, are used for the transmission of information between the distributor 1 and the loads or between the distributor 1, the loads and, moreover, sensors 70, 80 and control units 40, 50 and 60 connected to the voltage supply lines 2–4. Since each load 10, 20 and 30 is to be able not only to send, but also receive information, each load advantageously has a coding and decoding unit 11, 21 and 31 for coding and decoding the information that is to be transmitted and also a sending and receiving unit 12, 22 and 32 for sending and receiving the information that is to be transmitted.

Each control unit 40, 50 and 60 that is connected is generally used to control the transmission of information by way of the bus system and therefore also has a coding and decoding unit 41, 51 and 61 for coding and decoding the information that is to be transmitted and also a sending and receiving unit 42, 52 and 62 for sending and receiving the information that is to be transmitted. An operator can intervene manually in the transmission of information by way of the control units 40, 50 and 60 by selecting, by way of specific selection keys 45, 55 and 65 respectively of the control units, a specific load or a specific load type and by changing, by way of setting keys 44, 54 and 64 respectively, a specific operating parameter of the load type selected or the load selected, such as, for example, the brightness of the room or the temperature of the room. The individual loads are thereby addressed with the aid of addresses, with an individual address being associated with each load. The information that is transmitted from the corresponding control unit by way of the subnetwork used for the transmission of information is received by the load that is addressed or by all the loads that are addressed, decoded and converted into corresponding control signals so that the brightness of the lighting device 10, for example, is automatically regulated. Vice versa the operating state or the operating parameters of the individual loads is or are transmitted by the sending units 12, 22 and 32 of the loads by way of the building services management system so that each control unit 40, 50 and 60 can indicate the instantaneous state in displays 43, 53 and 63 respectively. It is also possible for scenarios predetermined by way of the selection keys 45, 55 and 65 of the control units 40, 50 and 60 respectively to be called up and for the individual loads or load types to be activated and set in accordance with a selected scenario. Thus, for example, a selection key can be assigned in such a way that after it has been actuated the lighting device 10 is dimmed to the value "semi-dark" and the room temperature is set to 20° C. by way of the air-conditioning installation 20 and also in a further room the blind 30 can be moved into the "semi-closed" position. A possible embodiment of the control units 40, 50 and 60 is described, for example, in DE-OS 94 12 900.

The sensors 70 and 80, which are also connected to the subnetwork that is used for the transmission of information enable the individual loads to be regulated automatically, since these sensors 70 and 80 also have a coding and decoding unit 71 and 81 respectively for coding and decoding the information that is to be transmitted as well as a sending and receiving unit 72 and 82 respectively for sending and receiving the information that is to be transmitted. FIG. 1, for example, shows a light sensor 70 for monitoring the brightness of the room and also a temperature sensor 80 for monitoring the internal or external temperature.

The actual values delivered by the sensors 70 and 80 are likewise transmitted by way of the voltage supply lines 2–4 to the control units 40, 50 and 60 so that these can automatically generate and transmit corresponding control signals for the individual loads.

Moreover, as shown in FIG. 1, it is also possible to connect to the building services management system an interface 90 to which, for example, further building services management systems can be connected or which can be provided to receive external control signals, for example from a computer or a remote control. Since the interface 90 also has to be able to transmit information data, the interface 90 likewise has a coding and decoding unit 91 and also a sending and receiving unit 92.

In general, the bus or building services management system shown in FIG. 1 enables information to be transmitted between the distributor 1 and the individual loads 10, 20 and 30, sensors 70 and 80, the interface 90 and also the control units 40, 50 and 60 irrespective of the arrangement in the individual rooms of the building services management system, with it being possible to use any known coding method, in particular PCM coding, to code the information that is to be transmitted, and also any known transmission method, in particular the so-called spread technique (SSMA, Spread Spectrum Multiple Access), to transmit the information.

The transmission system shown in FIG. 1 is influenced very greatly by the line conditions so in accordance with the present invention a test mode is integrated in the bus system shown in FIG. 1. In the exemplary embodiment shown in FIG. 1 in particular the control unit 50 connected to the distributor or gateway 1 is responsible for carrying out this test mode. Instead of this, however, it is also possible for the test function to be additionally performed by one of the control units 40, 60 connected to the branch lines 3 or 4. It would also be possible for the distributor 1, for its part, to form an independent control unit which can carry out all the control and test functions. The test function integrated in the bus system shown in FIG. 1 enables the communication functions of the individual subnetworks of the bus system to be controlled in a simple manner. The general function of this test mode shall be explained in greater detail in the following with reference to FIG. 2.

Figure 2:
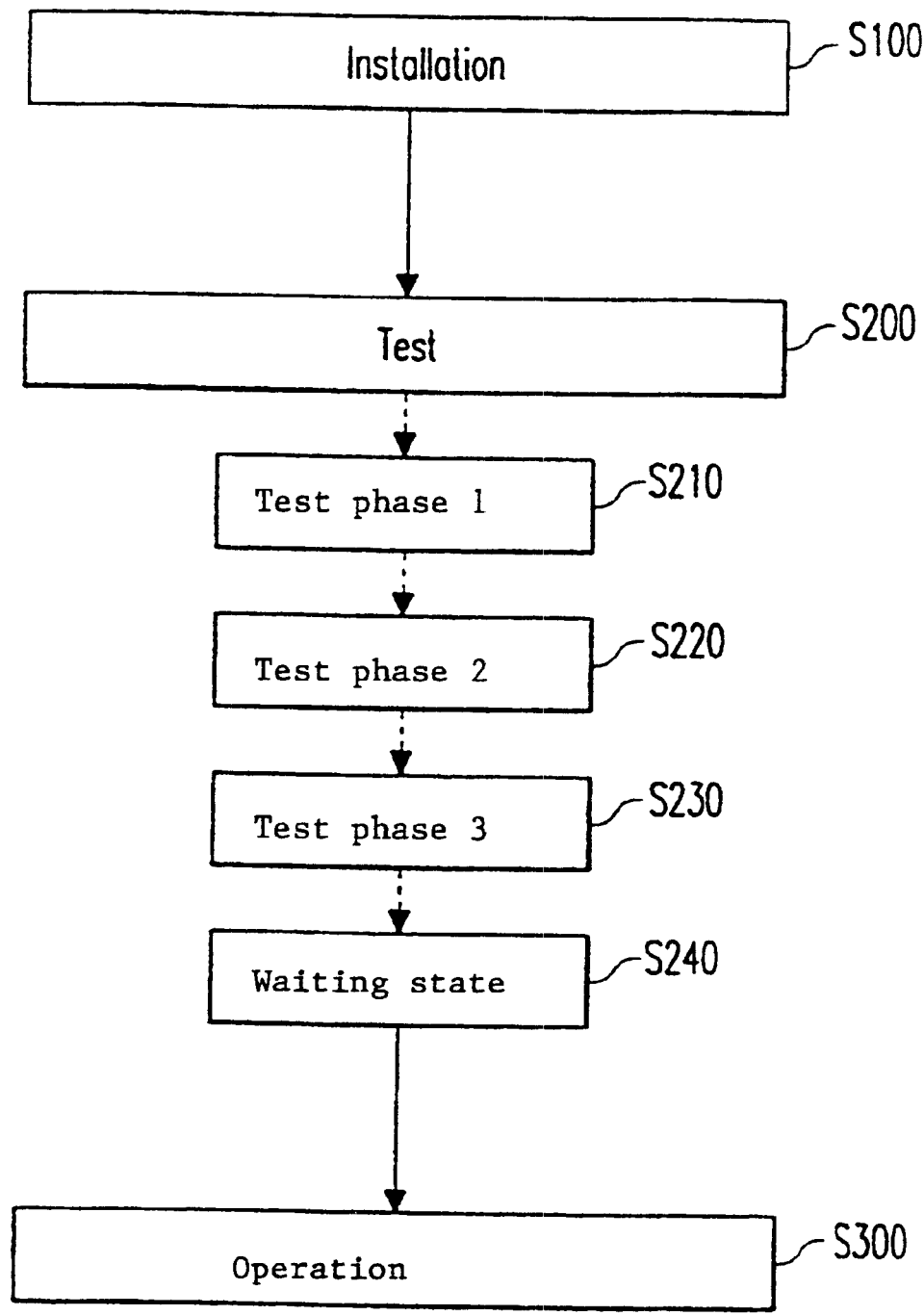
FIG. 2 shows a representation for the purpose of explaining the basic sequence of a preferred method in accordance with the present invention for commissioning the system shown in FIG. 1.

In general, FIG. 2 shows the sequence of the method for commissioning the bus system shown in FIG. 1. Basically installation of the bus system is to be carried out in the first instance (Step S100). In general, the assembly and connection of all the components of the bus system, that is, of all the control units, loads and lines and so on, are understood by the term installation. By means of the installation therefore in the first instance the wiring of the individual components of the bus system in terms of circuit engineering as shown in FIG. 1 is realized. The function test proposed in accordance with the invention (Step S200) follows the installation of the bus system. The proper functioning of the individual components of the bus system and also the communication paths between the individual components can be examined with the aid of the function test. In particular, the test mode can comprise a plurality of test phases, in which in accordance with the preferred exemplary embodiment in total three test phases 1–3 are run through in succession (S210, S220, S230), each of which tests different functional aspects of the bus system. With the aid of the first test phase it is possible to test whether all the loads or actuators of the bus system are being supplied by the correct subnetwork or the correct electric circuit and whether their safety functions are reacting and responding correctly. With the aid of the second test phase, for example, it is possible to test whether all the loads or actuators of the bus system can correctly understand the messages or control commands transmitted by a control unit so that, on the one hand, the sending function of the control unit and, on the other hand, the receiving function of the loads can be tested. Finally, with the aid of the third test phase it is possible to test the transmission in the direction from the load to the testing control unit 50 which, in accordance with FIG. 1, is coupled to the distributor or gateway 1. If all the test phases have been run through in an error-free manner, the system enters a waiting state (S240) which can only be left, for example, by switching on the main switch 6 of the bus system (power-on-reset) shown in FIG. 1 or by invoking the test function at the control unit 50 again. Advantageously, the individual test phases for each subnetwork or for each voltage control line 2–4 are carried cut individually in succession so that in accordance with the exemplary embodiment shown in FIG. 1 the test phases S210–S230 have to be run through three times in total before going over to the actual operation (Step S300). Configuration of the individual control units 40, 50 and 60, that is, the programming of predetermined scenarios or day-light characteristics which can be stored under the individual selection keys 45, 55 or 65 of the control units 40, 50 and can be subsequently called up, also occurs at the same time as the actual commissioning (S300). During the operation it is also possible for addresses to be associated with the individual loads in order to be able to address the individual loads roomwise or groupwise or else even individually.

Figure 3A:
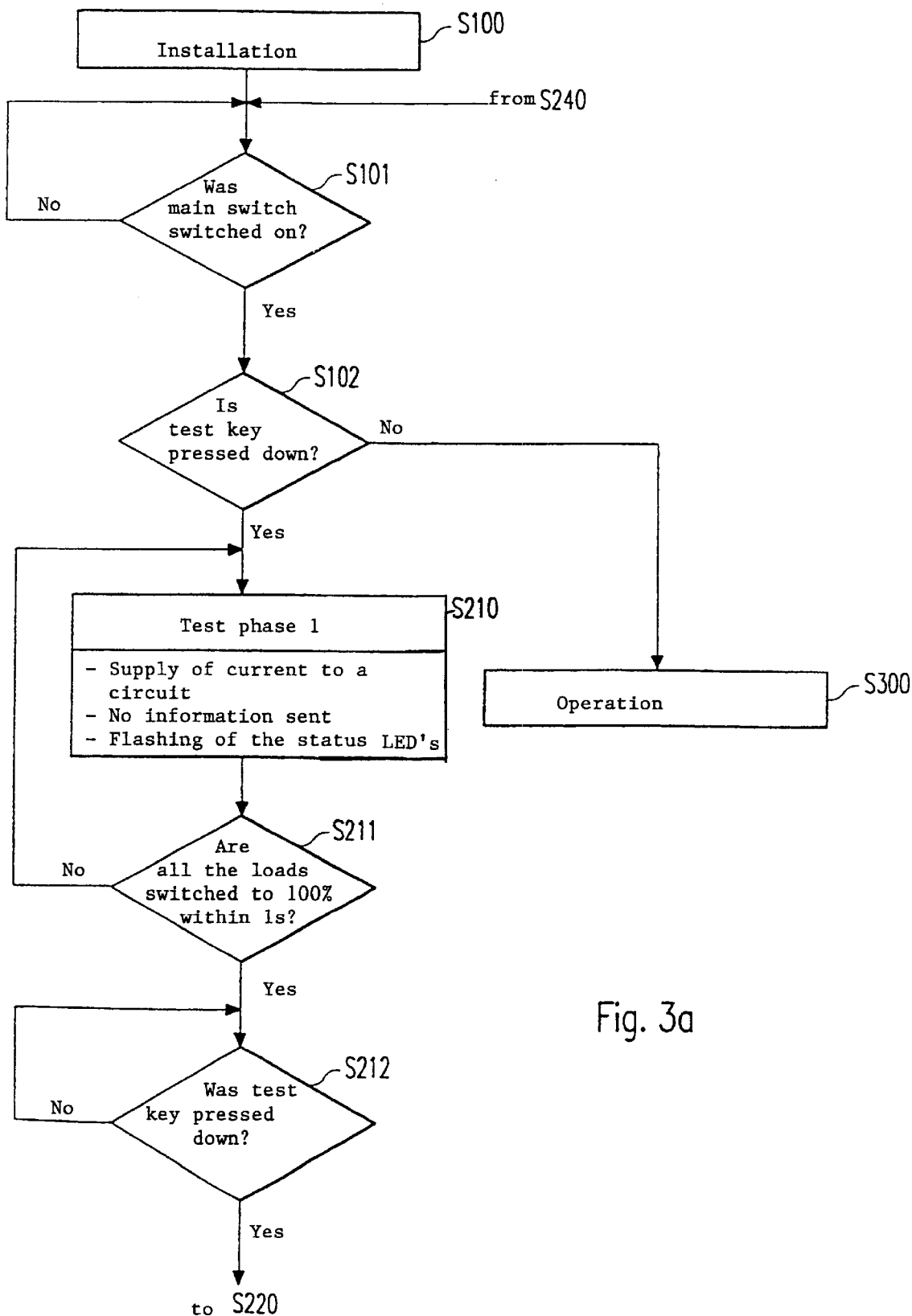
FIGS. 3a and 3b show representations in the form of a flow chart for the purpose of explaining the method of the present invention shown in FIG. 2 in a more detailed manner.
Figure 3B:
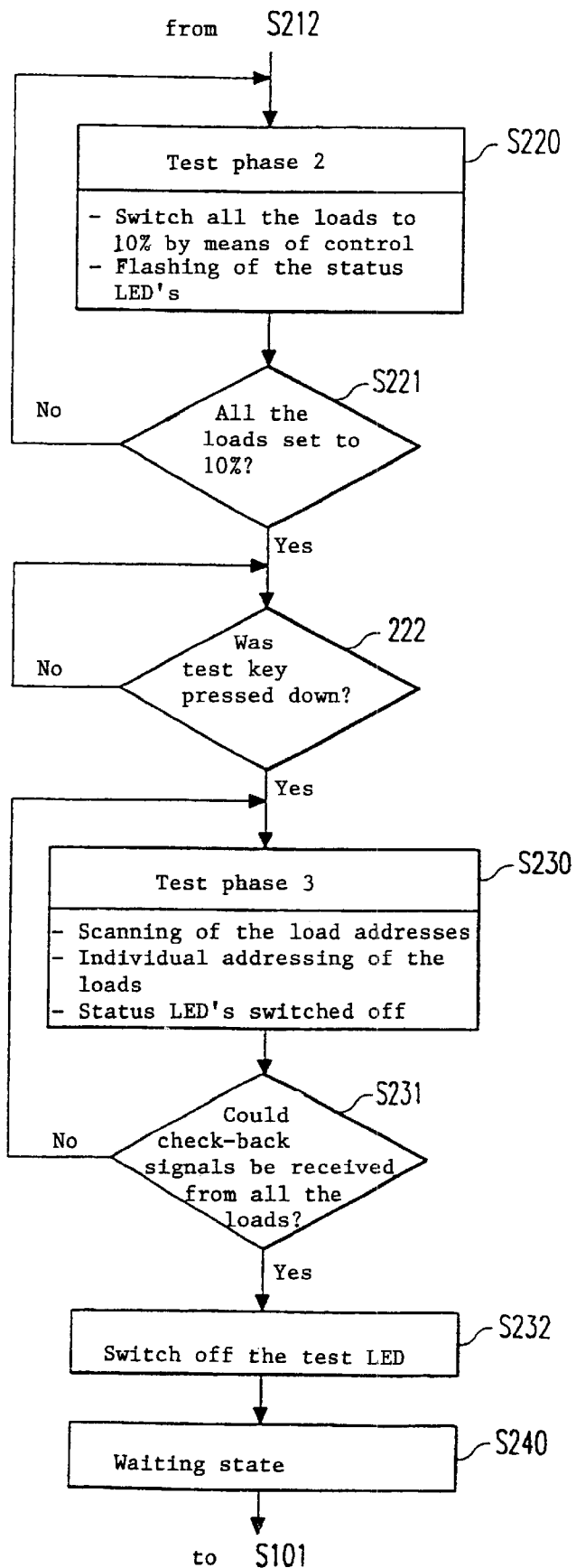

The test method proposed in accordance with the present invention shall be explained in greater detail in the following with reference to the flow chart which is shown in FIGS. 3a and 3b.

As has already been explained before, each circuit used for the transmission of information, that is, each of the voltage supply lines 2–4 of the bus system shown in FIG. 1, is tested individually so that during the test carried out on one of these subnetworks all the other subnetworks or circuits are switched so as to be without current. For this purpose, associated with each circuit there are switches or fuses 7–9 which can be opened and closed manually or else even automatically by the control or test unit 50. As shown in FIG. 1, in the first instance merely the voltage supply line 2 is connected to the central voltage supply line L, N, since merely the switch 7 is closed, whilst the switches 8 and 9 are open so that the voltage supply lines 3 and 4 are isolated from the central voltage supply line L, N. Thus in the following it is assumed that in the first instance it is the voltage supply line 2 with its corresponding subnetwork that is being tested.

The test mode is started in that a voltage supply line that is to be tested, that is, in the present case the voltage supply line 2, is supplied with current and at the same time a test key 56, which is provided on the control unit 50 coupled to the distributor or gateway 1, is held pressed down. Therefore in accordance with FIG. 3a in a first step in the first instance it is examined whether the main switch 6 of the bus system shown in FIG. 1 and also at least one of the switches 7–9 is switched on. If this is not the case, in the first instance the bus system remains in a waiting state. If, on the other hand, the main switch 6 is switched on, it is subsequently examined whether the test key 56 shown in FIG. 1 is also pressed down (Step 102). If this is not the case, this means that the test mode is not to be started so it is possible to proceed to the normal operating mode (S300).

If, on the other hand, when switching on the power supply the test key 56 at the distributor 1 or at the control unit 50 coupled thereto is pressed down at the same time, the first test phase is started (S210). In this first test phase merely the subnetwork that is to be tested or the voltage supply line 2 that is to be tested respectively is supplied with current without any information being transmitted by way of this voltage supply line 2 by the control unit 50 which is used as the test unit. As a rule, integrated in the individual loads or actuators there are safety functions which in the case of a break in communication or a failure of the central control unit (that is, if there is no transmission of information) leads to a specific action of the respective load so that, for example, if a break in communication occurs the lighting device 10 is switched to maximum brightness or the blind 30 is opened fully. In the first test phase the distributor 1 or the control unit 50 coupled thereto is inactive so that no information is transmitted by way of the forward channel and a break in communication or a central failure is simulated in respect of the loads of the circuit that is to be tested. Moreover, each of the sensors or interfaces 70, 80 and 90 connected to the bus system as well as each control unit 40, 50 and 60 and each switch or key, connected thereto if applicable, has a status light-emitting diode (status LED) 73, 83 and 93, and 46, 57 and 66 respectively, which is switched so as to flash during this first test phase, in which case in particular the flashing pattern of the sensors that are to be tested is switched in line with the flashing pattern of the light-emitting diode 57 at the test or control unit 50. During the first test phase this flashing pattern is comparatively rapid so the light-emitting diodes are, for example, each switched on or off at intervals of 0.5s.

Subsequently, in Step S211 it is tested whether the loads which are connected to the supply voltage line that is to be tested have responded correctly to the simulated break in communication. As a rule, the safety functions integrated in the individual loads are such that in the case of a break in communication, that is, in the case where no information is being transmitted by way of the voltage supply lines, the outputs of the individual loads are set at 100% power output so that in particular, for example, the lighting device 10 in this case is switched to maximum brightness. In Step S211 it is consequently examined whether the loads which are connected to the supply voltage line that is to be tested have attained a power output of 100% within a specific time span, in particular within 1s. Since in accordance with FIG. 1 in particular it is the supply voltage line 2 that is being tested, in Step S211 it is therefore tested whether within 1s the lighting device 10 has been switched to maximum brightness and the air-conditioning installation 20 has been switched to maximum power output. Moreover, in Step S211 it can be examined whether the status LED's of the corresponding sensors, keys, control units and so on actually flash in line with the status LED 57. If no error could be identified in Step S211, the first test phase is terminated. If, on the other hand, an error is identified in Step S211, attempts must be made to eliminate this error and the first test phase with Steps S210 and S211 is run through anew.

All in all therefore with the first test phase it is possible to verify whether all the loads or actuators of the bus system are being supplied by the correct subnetwork or the correct supply voltage line and whether the safety functions of the individual loads are reacting correctly.

By pressing down the test key 56 on the control or test unit 50 of the distributor 1 again, it is possible to start the second test phase (Step S212).

In the second test phase (Step S220), all the loads connected to the supply voltage line to be tested are set jointly to a specific power-output value, for example to 10% power output, by the control or test unit 50 with the aid of corresponding control information or a corresponding broadcast message. During the second test phase, the loads are not therefore addressed individually, but activated together by means of a common control command. Furthermore, the status LED's of the corresponding sensors, keys or control units are again switched so as to flash in line with the flashing pattern of the status LED 57 of the test or control unit 50, in which case in the second test phase the flashing pattern is slower than in the first test phase so that the light-emitting diodes are, for example, in each case switched on or off for periods of 1s.

In Step S221, it is subsequently examined whether the loads connected to the voltage supply line to be tested have actually been set to the desired power-output value. It is also possible to examine whether the status LED's of the corresponding sensors, control units or keys have actually been switched so as to flash. In the present case, in particular in Step S221, it is examined whether the lighting device 10 connected to the voltage supply line 2 has been dimmed to a brightness value corresponding to a power output of 10% and the air-conditioning installation 20 has been set to a temperature output of 10%. It is also examined whether the status LED 73 provided on the light sensor 70 is flashing in line with the flashing pattern of the status LED 57 of the control unit 50. If no error is identified during step S221, the second test phase is terminated. If, on the other hand, an error did occur during the second test phase, after elimination of the error the second test phase can be recommenced from the start.

After the second test phase has been run through successfully, it is thus established whether all the loads of the supply voltage line that is to be tested can correctly understand the information or messages sent by the control unit 50 so that with the aid of the second test phase it is possible to test whether the individual users of the bus system can receive information, transmitted by way of the forward channel of the bus system, with a certain degree of quality. All in all therefore during the second test phase, on the one hand, the sending function of the control unit 50 or the distributor 1 respectively is tested and, on the other hand, the receiving function of the individual users is tested.

In a supplementary manner, during the second test phase it can be provided that the control unit 50 or the distributor 1, moreover, search for loads that are connected to the respective voltage supply line that is to be tested.

By means of further actuation of the test key 56 provided on the control unit 50 it is possible to proceed to the third test phase (Step S222).

During this third test phase the control or test unit 50 or the distributor 1 searches for loads that are connected to the voltage supply line that is to be tested or the subnetwork that is to be tested and requires the loads that are connected to transmit the addresses, which are allocated to them, by way of the bus system so that these addresses can be stored by the control unit 50 or the distributor 1. Subsequently, the control unit 50 is able to address and set the individual loads individually in succession by sending a corresponding control command. In particular it can be provided that after the load addresses have been scanned, the individual loads can be run individually in succession, by being addressed in a corresponding manner, from 10% power output to 0% power output so that subsequently the user, who is putting the system into operation, can see from the changes in state of the individual loads whether the communication by way of the bus system is functioning in both directions, that is, both by way of the forward channel and by way of the backward channel. During the third test phase, moreover, the status LED's at the respective sensors, control units and keys are permanently switched on or off analogously to the status LED 57 of the control unit 50 in order to signal the third test phase.

During the third test phase (Step S230) the loads of the voltage supply line to be tested can also be adjusted by keys or control units connected, if applicable, to the respective voltage supply line.

During a Step S231 it is subsequently examined whether the check-back signals, sent in consequence of an adjustment or addressing of the loads of the voltage supply line to be tested, could be received with sufficient quality by the distributor 1 or the control unit 50 coupled thereto. A display means, which indicates whether the signal quality of all the check-back signals/messages of the individual loads suffices or not, can optionally be provided on the control unit 50. In particular, the display 53 that is already provided on the control unit can come into consideration for this purpose.

If, however, in Step S231 it has been identified that not all the check-back signals could be received correctly, after the fault has been eliminated the third test phase is to be run through anew.

In general therefore the transmission of check-back signals from the loads to the distributor 1 and also the receiving capacity of the distributor 1 or the control unit 50 respectively is tested with the aid of the third test phase.

If no error has been identified in the third phase either, the status LED 57 on the control unit 50 is finally permanently switched off, thereby signalling the end of the test mode. The bus system, however, is not yet ready for normal operation, but first enters a waiting state S240 in which the bus system or the distributor 1 remains for so long until the test key 56 on the control unit 50 is actuated anew or a power-on-reset-command, that is, renewed actuation of the main switch 6 of the bus system, has been identified. The waiting state (S240) shown in FIG. 3*b* is thus equivalent to an examination in accordance with steps S101 and S102 (cf. FIG. 3*a*). When the current is switched on again without pressing down the test key 56 on the control unit 50, the bus system or the distributor 1 goes over into the normal operating mode (S300).

In the flow chart shown in FIGS. 3*a* and 3*b* it is assumed that when an error occurs merely the corresponding test phase has to be repeated. Instead of this, however, it is also possible that, when an error occurs and is identified, the whole test, starting with the first test phase, is repeated.

What is claimed is:
1. Method for commissioning a bus system, wherein
the bus system comprises at least one voltage supply line by way of which, on the one hand, a supply voltage is applied to loads that can be connected thereto and, on the other hand, information is transmitted at information frequencies higher than the frequency of said supply voltage, comprising the steps of:
a) installing the bus system;
b) testing whether the bus system is functioning properly; and c) operating the bus system,
wherein step b) comprises the step of carrying out a plurality of test phases in succession, wherein different aspects of the bus system's ability to function properly are tested, and
including, during a first test phase, the step of testing the correct connection of loads, sensors and/or control devices to respective voltage supply lines by means of information transmitted via said bus system at said information frequencies.

2. Method according to claim 1, wherein
the bus system comprises a plurality of voltage supply lines each of which is selectively connectable to a central voltage supply line in a manner to apply, on the one hand, a supply voltage to respective loads connected thereto and, on the other hand, to transmit information, and during step b) testing each voltage supply line individually, while maintaining the other respective voltage supply lines isolated from the central voltage supply line.

3. Method according to claim 2, including the step of carrying out individual tests for each voltage supply line, such tests being carried out separately in succession, while maintaining the other respective voltage supply lines isolated from the central voltage supply line.

4. Method according to claim 1, including the step of carrying out, during a first test phase, testing for a correct response of a safety function that is implemented in the connected loads, sensors and/or control devices, such response occurring in the case of an interruption in the transmission of information by way of the corresponding voltage supply line.

5. Method according to claim 1, including the step of applying, during a first test phase, merely a supply voltage to a voltage supply line that is to be tested without any information being transmitted by way of the voltage supply line, and subsequently testing to ascertain whether loads which are connected to the voltage supply line have set a specific power output within a specific time span.

6. Method according to claim 5, wherein
the specific time span amounts to one second and wherein the specific power output corresponds to a power output that corresponds to a predetermined response from a safety function test.

7. Method according to claim 5, including, during said first test phase after applying the supply voltage to the corresponding voltage supply line, the step of testing, without transmitting information, the connection of sensors and/or control devices to corresponding voltage supply lines by examining any activation of display means of the sensors and/or control devices that is brought about by the applied supply voltage.

8. Method according to claim 1, including, during a second test phase, the step of testing the information transmitting capacity of the bus system.

9. Method according to claim 8, including, during the second test phase, the step of carrying out a test to check whether the loads, sensors and/or control devices that are connected to corresponding voltage supply lines are correctly receiving the information that is transmitted by way of said voltage supply lines.

10. Method according to claim 9, including, during the second test phase, the step of transmitting specific control information to the loads that are connected, and further including the step of subsequently examining whether the respective loads have reacted correctly to the control information that is transmitted by way of the corresponding voltage supply lines.

11. Method according to claim 10, wherein
control information transmitted during said second test phase corresponds to a 10% power output of the loads that are connected to the corresponding voltage supply lines.

12. Method according to claim 11, including, during a third test phase, the step of testing the transmission capacity of the bus system for transmitting check-back signals of the loads, sensors and/or control devices that are connected to the corresponding voltage supply lines.

13. Method according to claim 12, wherein
each load is activatable by means of a load-specific address, and including, during the third test phase, the step of individually activating individual loads after scanning their addresses, by way of the respective load-specific address, whereby, by means of transmission of corresponding control information by way of corresponding voltage supply lines, they are set to a power output of 0% and whereby that corresponding check-back signals of the activated loads may be evaluated.

14. Method according to claim 12, including, during the third test phase, the step of adjusting loads that are connected to the corresponding voltage supply lines, said step of adjusting being carried out by means of control units which are connected to the same voltage supply lines, and including the further step of subsequently examining whether control means coupled to the voltage supply lines can correctly receive the check-back signals transmitted by the corresponding loads after the latter have been adjusted.

15. Method according to claim 14, including the step of measuring and displaying, during said third test phase, the quality of the check-back signals received by the control means.

16. Method according to claim 12, including, during the second and third test phases, the step of automatically searching for loads that are connected to the corresponding voltage supply lines, said searching being carried out by means of control means coupled to the voltage supply lines being tested.

17. Method according to claim 1, including the step of displaying, with a display means, the respective test phase that is currently running.

18. Method according to claim 1, including the step of initiating each test phase of step b) by actuation of a corresponding test-activation means.

19. Method according to claim 1, including the repeating a test phase in response to the identification of an error in said test phase.

20. Method according to claim 1, including the step of transferring the bus system into a waiting state after step b) has been carried out, until step b) has been carried out again or until step c) is initiated, by a user.

21. Method according to claim 1, including the step of automatically initiating step b) after step a) when a central supply voltage is applied to the bus system and when test-activation means of the bus system are simultaneously activated, and further including the step of automatically initiating step c) after step a) when the central supply voltage is applied without simultaneous activation of the test-activation means.

22. Apparatus for commissioning a bus system, which comprises at least one voltage supply line by way of which a supply voltage having a supply voltage frequency is applied to loads that can be connected thereto, said bus system being capable of transmitting information at information frequencies higher than said supply voltage frequency, said apparatus comprising:

a plurality of test devices constructed to test whether the bus system is functioning properly;

electrical circuits connecting said test devices to said bus system to enable said test devices to carry out a plurality of test phases in succession, wherein different aspects of the bus system's ability to function properly are tested; and a control unit connected and arranged to control the operation of said test devices to test the correct connection of loads, sensors and/or control devices to respective voltage supply lines according to information transmitted via said bus system at said information frequencies.

23. Apparatus according to claim 22, wherein the bus system comprises a plurality of voltage supply lines each of which is selectively connectable to a central voltage supply line in a manner to apply, on the one hand, a supply voltage to respective loads connected thereto and, on the other hand, to transmit information, and said test devices being arranged to test each voltage supply line individually, while maintaining the other respective voltage supply lines isolated from the central voltage supply line.

24. Apparatus according to claim 23, including test devices for carrying out individual tests for each voltage supply line separately in succession, while maintaining the other respective voltage supply lines isolated from the central voltage supply line.

25. Apparatus according to claim 22, including as test device for carrying out, during a first test phase, testing for a correct response of a safety function that is implemented in the connected loads, sensors and/or control devices, such response occurring in the case of an interruption in the transmission of information by way of the corresponding voltage supply line.

26. Apparatus according to claim 22, wherein said test devices are arranged such during a first test phase, merely a supply voltage is supplied to a voltage supply line that is to be tested without any information being transmitted by way of the voltage supply line, and subsequently a test is conducted to ascertain whether loads which are connected to the voltage supply line have set a specific power output within a specific time span.

27. Apparatus according to claim 26, wherein the specific time span amounts to one second and wherein the specific power output corresponds to a power output that corresponds to a predetermined safety function response.

28. Apparatus according to claim 26, including a test device that, during said first test phase after supply voltage is supplied to the corresponding voltage supply line, tests, without transmitting information, the connection of sensors and/or control devices to corresponding voltage supply lines by examining any activation of display means of the sensors and/or control devices that is brought about by the supplied supply voltage.

29. Apparatus according to claim 22, including a test device which, during a second test phase, tests the information transmitting capacity of the bus system.

30. Apparatus according to claim 29, including a test device for carrying out a test to check whether the loads, sensors and/or control devices that are connected to corresponding voltage supply lines are correctly receiving the information that is transmitted by way of said voltage supply lines.

31. Apparatus according to claim 30, including a circuit for transmitting specific control information to the loads that are connected during the second test phase, and further including a circuit for subsequently examining whether the respective loads have reacted correctly to the control information that is transmitted by way of the corresponding voltage supply lines.

32. Apparatus according to claim 31, wherein control information transmitted during said second test phase corresponds to a 10% power output of the loads that are connected to the corresponding voltage supply lines.

33. Apparatus according to claim 32, including a test device which, during a third test phase, tests the transmission capacity of the bus system for transmitting check-back signals of the loads, sensors and/or control device that are connected to the corresponding voltage supply lines.

34. Apparatus according to claim 33, wherein each load is activatable by means of a load-specific address, and including a test device which, during said third test phase, individually activates individual loads after scanning their addresses, by way of the respective load-specific address, whereby, by means of transmission of corresponding control information by way of corresponding voltage supply lines, they are set to a power output of 0% and whereby that corresponding check-back signals of the activated loads may be evaluated.

35. Apparatus according to claim 33, including an adjustment device which, during a third test phase, adjusts loads that are connected to the corresponding voltage supply lines, said adjustment device including control units which are connected to the same voltage supply lines, and further including examining means arranged to subsequently examine whether control means coupled to the voltage supply lines can correctly receive the check-back signals transmitted by the corresponding loads after the latter have been adjusted.

36. Apparatus according to claim 35, including a measuring and display device arranged to measure and display, during said third test phase, the quality of the check-back signals received by the control means.

37. Apparatus according to claim 33, further including, during the second and third test phases, control means connected to the voltage supply lines being tested, said control means being arranged to automatically search for loads that are connected to the corresponding voltage supply lines.

38. Apparatus according to claim 22, including display means arranged to display the respective test phase that is currently running.

39. Apparatus according to claim 22, further including test-activation means for initiating each test phase of testing whether the bus system is functioning properly by actuation of a corresponding test-activation means.

40. Apparatus according to claim 22, including means to repeat a test phase in response to the identification of an error in said test phase.

41. Apparatus according to claim 22, including a transfer circuit for transferring the bus system into a waiting state after testing whether the bus system is functioning properly has been carried out, or until said testing is again initiated by a user, or when operation of the bus system is initiated by the user.

42. Apparatus according to claim 22, further including an initiating device for automatically initiating testing as to whether the bus system, after installation, is functioning properly has been carried out when a central supply voltage is applied to the bus system and when test-activation means of the bus system are simultaneously activated, and further including a further initiating means for initiating operation of the bus system when the central supply voltage is applied without simultaneous activation of the test-activation means.

* * * * *